United States Patent [19]

Steele

[11] Patent Number: 4,928,921
[45] Date of Patent: May 29, 1990

[54] BALL VALVES FOR PIPELINES

[75] Inventor: John Steele, Fife, United Kingdom

[73] Assignee: T K Valve Limited, United Kingdom

[21] Appl. No.: 419,615

[22] Filed: Oct. 10, 1989

[51] Int. Cl.[5] ................................................ F16K 5/22
[52] U.S. Cl. ...................................... 251/175; 251/315
[58] Field of Search ......................... 251/174, 175, 315

[56] References Cited

U.S. PATENT DOCUMENTS 3,548,858 12/1970 Wolfensperger ............... 251/315 X
4,071,220 1/1978 Fino ................................ 251/315 X

*Primary Examiner*—John C. Fox
*Attorney, Agent, or Firm*—Mason, Fenwick & Lawrence

[57] ABSTRACT

In a ball valve, valve seats are spring-urged against a valve ball turnable between open and closed position. Each seat has an annular face confronting the ball, the face being a surface of revolution of a line inclined to the said axis. The face is interrupted by an annular groove so as to leave a radially inner annular rib having a radially inner part of the said face. At low pressures there is line contact with the ball nearer the radially outer edge of the inner face part. however, at high pressures elastic distortion of the ball is accompanied by an elastic radially outward flexing of said rib so that said line contact moves nearer the radially inner edge of the inner face part. The contacting surfaces of the ball and the seats are preferably coatings of tungsten carbide. In normal operation the outer face part is clear of the ball but is available for contact with the ball in emergency conditions.

3 Claims, 2 Drawing Sheets

BALL VALVES FOR PIPELINES

DESCRIPTION

This invention relates to ball valves for pipelines.

A ball valve consists generally of a valve housing, a valve ball in the housing turnable between open and closed positions, pipe connectors or so called adaptors connected to opposite ends of the housing, and valve seats located in recesses in said adaptors and/or housing and resiliently urged into sealing engagement with the ball.

An object of the invention is to provide a ball valve capable of maintaining a good seal between the ball and the valve seats when the ball is in a closed position and a high pressure exists in the pipe line and also to satisfy fire safe requirements.

For convenience of description, the term "housing" will hereinafter be assumed to include said adaptors or similar pipe coupling means.

According to the invention there is provided a ball valve as above described, wherein each valve seat has an annular face confronting the ball, the face being a surface of revolution about the axis of the seat of a line inclined to the said axis, the face being interrupted by an angular groove so as to leave a radially inner annular rib having a radially inner part of the said face, the said face being so arranged relative to the ball that at low pressures there is line contact of the ball with the seat nearer the radially outer edge of the radially inner part of the said face, and at high pressures where the ball undergoes elastic deformation from a true sphere towards an oblate spheroid there is an accompanying elastic radially outward flexing of the radially inner annular rib so that the line contact of the ball with the seat moves nearer the radially inner edge of the radially inner part of the said face, and the radially outer part of the said face is clear of the ball in normal operation but is available to come into contact with the ball in the event of failure of the ball valve.

Preferably, the contacting surfaces of the ball and the seat are of the same material and more preferably are coatings of tungsten carbide.

An embodiment of the invention will now be described, by way of example, with reference to the accompanying drawings, in which.

Figure 1:
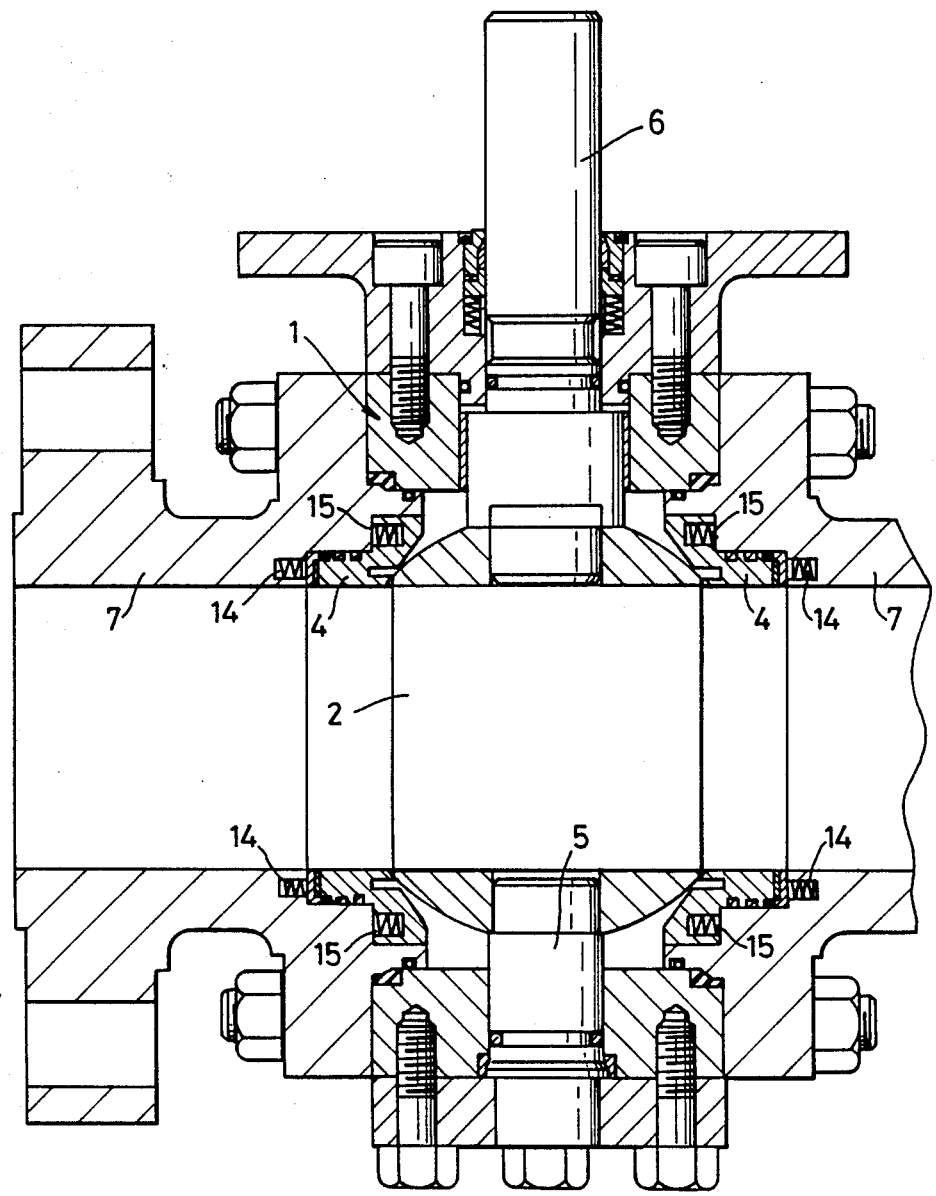
FIG. 1 is a sectional view of a ball valve according the present invention.
Figure 2:
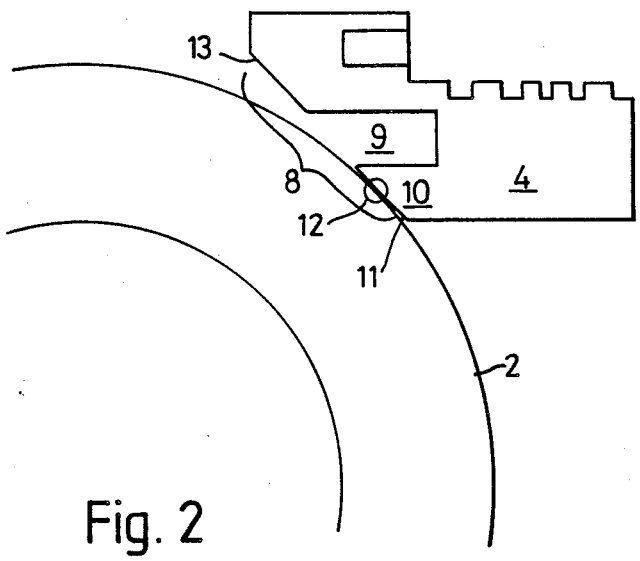
FIG. 2 is an enlarged view of one seat engaging the ball in the closed position, at light pressure.
Figure 3:
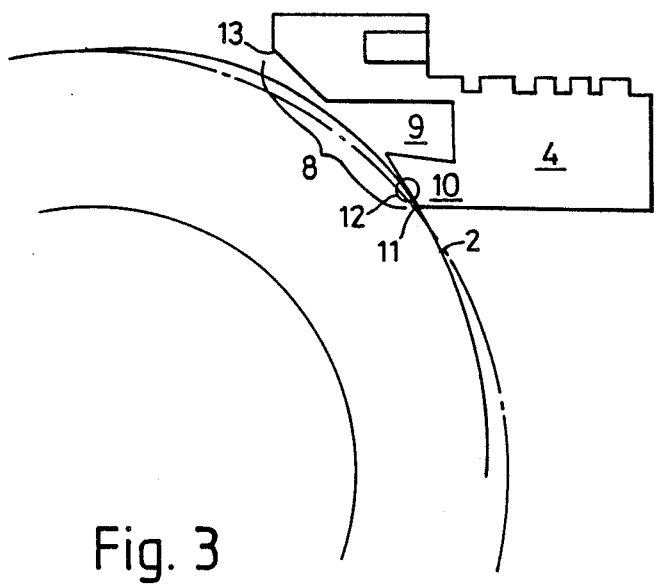
FIG. 3 is the same view as FIG. 2 but at high pressure with the consequent distortions shown heavily exaggerated for the sake of clarity.

Referring to FIG. 1, a ball valve consists generally of a valve housing 1, a valve ball 2 having a through passage, valve seat members 4 upstream and downstream of the ball, a trunnion 5 on which the ball 2 is rotatably adjustable, and a control shaft 6 in driving connection with the ball 2 and turnable through gearing or by a wrench. As aforesaid, for convenience of description, it will be assumed that end pipe connectors or so-called adaptors 7 from part of the housing The valve seat members 4 are identical and the upstream one will now be described with reference to FIGS. 2 and 3. The seat member 4 has an annular face 8 confronting the ball 2. The face 8 is a surface of revolution about the axis of the seat member 4 of a line inclined to the said axis. The face 8 is interrupted by an annular groove 9 so as to leave a radially inner annular rib 10 having a radially inner part 11 of the said face 8. The face 8 is so arranged relative to the ball 2 that at low pressure (as shown in FIG. 2) there is line contact 12 of the ball 2 with the seat 4 nearer the radially outer edge of the part 11 of the face 8. However, at high pressures the ball 2 undergoes elastic distortion from a true sphere towards an oblate spheroid. This is accompanied by elastic radially outward flexing of the rib 10 so that the line contact 12 of the ball 2 with the seat 4 moves nearer the radially inner edge of the part 11 of the face 8. Thus a good seal is maintained between the ball 2 and the seat 4.

In normal operation the radially onto part 13 of the face 8 remains clear of the ball 2 regardless of the pressure within the ball valve. However, in the event of a failure in the ball valve the part 13 of the face 8 is available to come into contact with the ball.

It is envisaged to provide the ball 2 and at least the face 8 of the seat member 4 with a coating of tungsten carbide. With such a hard material there would be very little wear and friction between the ball 2 and the seat member.

It is to be noticed that the seat members 4 are spring-urged at 14 and 15 towards the ball 2. Further details of the valve in FIG. 1 are described in detail in U.S. Pat. No. 4,318,420 but are not described here since they are not relevant to the present invention.

I claim:

1. A ball valve comprising a valve housing, a valve ball in the housing turnable between open and closed position, pipe connectors or so-called adaptors connected to opposite ends of the housing and valve seats located in recesses in said adaptors and/or housing and resiliently into sealing engagement with the ball, wherein each valve seat has an annular face confronting the ball, the face being a surface of revolution about the axis of the seat of a line inclined to the said axis, the face being interrupted by an annular groove so as to leave a radially inner annular rib having a radially inner part of the said face, the said face being so arranged relative to the ball that at low pressures there is line contact of the ball with the seat nearer the radially outer edge of the radially inner part of the said face, and at high pressures where the ball undergoes elastic deformation from a true sphere towards an oblate spheroid there is an accompanying elastic radially outward flexing of the radially inner annular rib so that the line contact of the ball with the seat moves nearer the radially inner edge of the radially inner part of the said face, and the radially outer part of the said face is clear of the ball in normal operations but is available to come into contact with ball in the event of failure of the ball valve.

2. A ball valve according to claim 1, wherein the contacting surfaces of the ball and the sent are of the same material.

3. A ball valve according to claim 2, wherein the contacting surfaces of the ball and the seat are coatings of tungsten carbide.

* * * * *